(12) United States Patent
Vahala et al.

(10) Patent No.: US 7,515,617 B1
(45) Date of Patent: Apr. 7, 2009

(54) PHOTONIC DEVICE HAVING HIGHER ORDER HARMONIC EMISSIONS

(75) Inventors: Kerry J. Vahala, Pasadena, CA (US); Tal Eliezer Carmon, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 182 days.

(21) Appl. No.: 11/560,319

(22) Filed: Nov. 15, 2006

Related U.S. Application Data

(60) Provisional application No. 60/736,956, filed on Nov. 15, 2005.

(51) Int. Cl.
*H01S 3/10* (2006.01)
*H01S 3/08* (2006.01)

(52) U.S. Cl. .............................. 372/21; 372/22; 372/92

(58) Field of Classification Search ............... 372/21, 372/22, 92, 94
See application file for complete search history.

(56) References Cited

U.S. PATENT DOCUMENTS

| | | | |
|---|---|---|---|
| 3,589,794 A | 6/1971 | Marcatili | |
| 3,760,297 A | 9/1973 | Thompson et al. | |
| 3,913,126 A | 10/1975 | Hooker et al. | |
| 4,282,499 A | 8/1981 | DeFonzo | |
| 4,695,121 A | 9/1987 | Mahapatra et al. | |
| 5,343,490 A | 8/1994 | McCall | |
| 5,651,022 A | 7/1997 | Anthon et al. | |
| 5,878,070 A | 3/1999 | Ho et al. | |
| 6,052,495 A | 4/2000 | Little et al. | |
| 6,078,605 A | 6/2000 | Little et al. | |
| 6,101,300 A | 8/2000 | Fan et al. | |
| 6,222,964 B1 | 4/2001 | Sadot et al. | |
| 6,259,717 B1 | 7/2001 | Stone et al. | |
| 6,741,628 B2 | 5/2004 | Painter et al. | |
| 6,901,101 B2 | 5/2005 | Frick | |
| 2002/0018611 A1 | 2/2002 | Maleki et al. | |
| 2003/0021518 A1 | 1/2003 | Smirnov et al. | |
| 2004/0179573 A1 | 9/2004 | Armani et al. | |
| 2005/0169331 A1 | 8/2005 | Vahala et al. | |

FOREIGN PATENT DOCUMENTS

| | | |
|---|---|---|
| FR | 2 703 473 | 10/1994 |
| JP | 05203826 | 8/1993 |
| WO | WO-98/05995 | 2/1998 |

OTHER PUBLICATIONS

Little, B.E., et al., "Vertically coupled glass microring resonator channel dropping filters," *Ieee Photonics Technology Letters*, vol. 11, pp. 215-217 (1999).

(Continued)

*Primary Examiner*—Armando Rodriguez
(74) *Attorney, Agent, or Firm*—Connolly Bove Lodge & Hutz LLP

(57) ABSTRACT

A photonic device is disclosed which has higher order harmonic emissions. A pump source is adapted to emit a laser beam at a source frequency and to have a power output of less than approximately 100 Watts. A micro-cavity resonator, which is adapted to exhibit inversion symmetry, is optically coupled to the pump source to receive light from the laser beam. The micro-cavity resonator emits light at an emission frequency while light is received from the laser beam, where the emission frequency is approximately three or more times the source frequency.

86 Claims, 13 Drawing Sheets

OTHER PUBLICATIONS

Offrein, B.J., et al., "Resonant coupler-based tunable add-after-drop filter in silicon-oxynitride technology for WDM networks," *Ieee Journal of Selected Topics in Quantum Electronics*, vol. 5, pp. 1400-1406 (1999).

Little, B.E., et al., "Microring resonator channel dropping filters", *Journal of Lightwave Technology*, vol. 15, pp. 998-1005 (1997).

Grover, R., et al., "Parallel-cascaded semiconductor microring resonators for high-order and wide-FSR filters", *Journal of Lightwave Technology*, vol. 20, pp. 900-905 (2002).

Yanagase, Y., et al., "Box-like filter response and expansion of FSR by a vertically triple coupled microring resonator filter", *Journal of Lightwave Technology*, vol. 20, pp. 1525-1529 (2002).

Krioukov, E., et al., "Sensor based on an integrated optical microcavity", *Optics Letters*, vol. 27, pp. 512-514 (2002).

Vollmer, F., et al., "Protein detection by optical shift of a resonant microcavity", *Applied Physics Letters*, vol. 80. (21), pp. 4057-4059 (2002).

Bumki, M., et al., "Compact, fiber-compatible, cascaded Raman laser", *Optics Letters*, vol. 28 (17), pp. 1507-1509 (2003).

Kleppner, D., "Inhibited Spontaneous Emission", *Physical Review Letters*, vol. 47, pp. 233-236 (1981).

Yang, L., et al., "Fiber-coupled Erbium Microlasers on a chip", *Applied Physics Letters*, vol. 83 (5), pp. 825-826 (2003).

Kippenberg, S.M., et al., "Fabrication and coupling to planar high-Q silica disk microcavities", *Applied Physics Letters*, vol. 83 (4), pp. 797-799 (2003).

Yang, L., et al, "Gain functionalization of silica microresonators", *Optics Letters*, vol. 28, No. 8, pp. 592-594 (2003).

Schiller, S., et al., "fused-silica monolithic total-internal-reflection resonator", *Optics Letters*, vol. 17 (5), pp. 378-380 (1992).

Knight, J.C., "Phase-matched excitation of whispering-galiery-mode resonances by a fiber taper", *Optics Letters*, vol. 22 (15), pp. 1129-1131 (1997).

Yariv, A., "Universal relations for coupling of optical power between microresonators and dielectric waveguides", *Electronics Letters*, vol. 36 (4), pp. 321-322 (2000).

Little, B.E., et al., "Wavelength Switching and Routing Using Absorption and Resonance", *IEEE Photonics Technology Letters*, vol. 10 (6), pp. 816-818 (1998).

Chu, D., et al., "Observation of Enhanced Photoluminescence in Erbium-Doped Semiconductor Microdisk Resonator", *Applied Physics Letters*, vol. 66 (21), pp. 2843-2845 (1995).

Kawachi, M., "Silica Waveguides on Silicon and Their Application to Integrated-Optic Components", *Optical and Quantum Electronics*, vol. 22, pp. 291-416 (1990).

Von Klitzing, W., et al., "Tunable Whispering Gallery Modes for Spectrosocpy and CQED Experiments", *New Journal of Physics*, vol. 3, pp. 14.1-14.4 (2001).

Gayral, B. et al., "High-Q wet-etched GaAs microdisks containing InAs quantum boxes", *Applied Physics Letter*, vol. 75 (13), pp. 1908-1910.

Gerard, J.M., et al., "Quantum boxes as active probes for photonic microstructures: the pillar microcavity case", *Applied Physics Letters*, vol. 69, pp. 449-451 (1996).

Gorodetsky, M.L., et al. "Ultimate Q of optical microsphere resonators", *Optics Letters*, vol. 21, pp. 453-455 (1996).

Vernooy, D.W., et al., "High-Q measurements of fused-silica microspheres in the near infrared", *Optics Letters*, vol. 23, pp. 247-249 (1998).

Cai, M., et al., "Observation of critical coupling in a fiber taper to a silica-microsphere whispering-gallery mode system", *Physical Review Letters*, vol. 85, pp. 74-77 (2000).

Spillane, S.M., et al., "Ultralow-threshold Raman laser using a spherical dielectric microcavity", *Nature*, vol. 415, pp. 621-623 (2002).

Michler, P., et al., "quantum dot lasers using high-Q microdisk cavities", *Physica Status Solidi B-Basic Research*, vol. 224, pp. 797-801 (2001).

Cai, M., et al., "Fiber-coupled microspher laser", *Optics Letters*, vol. 25, pp. 1430-1432 (2000).

McCall, S.L., et al., "Whispering-Gallery Mode Microdisk Lasers", *Applied Physics Letters*, vol. 60, pp. 289-291 (1992).

Sandoghdar, V., et al., "Very low whispering-gallery-mode microsphere laser", *Physical Review A*, vol. 54, pp. R1777-R1780 (1996).

Djordjev, K., et al., "Microdisk tunable resonant filters and switches", *Ieee Photonics Technology Letters*, vol. 14, pp. 828-830 (2002).

Rabiei Payam, W.H.S., et al., "Polymer Micro-Ring Filters and Modulators", *Journal of Lightwave Technology*, vol. 20, pp. 1968-1975 (2002).

Djordjev, K., Choi, et al., "Vertically coupled InP microdisk switching devices with electroabsorptive active regions", *Ieee Photonics Technology Letters*, vol. 14, pp. 1115-1117 (2002).

Yvariv, A., "Critical coupling and its control in optical waveguide-ring resonator systems", *Ieee Photonics Technology Letters*, vol. 14, pp. 483-485 (2002).

Soref, R.A., et al., "Proposed N-wavelength M-fiber WDM cross connect switch using activy microring resonators", *Ieee Photonics Technology Letters*, vol. 10, pp. 1121-1123 (1998).

Chu, S.T., et al., "An eight-channel add-drop filter using vertically coupled microring resonators over a cross grid", *Ieee Photonics Technology Letters*, vol. 11, pp. 691-693 (1999).

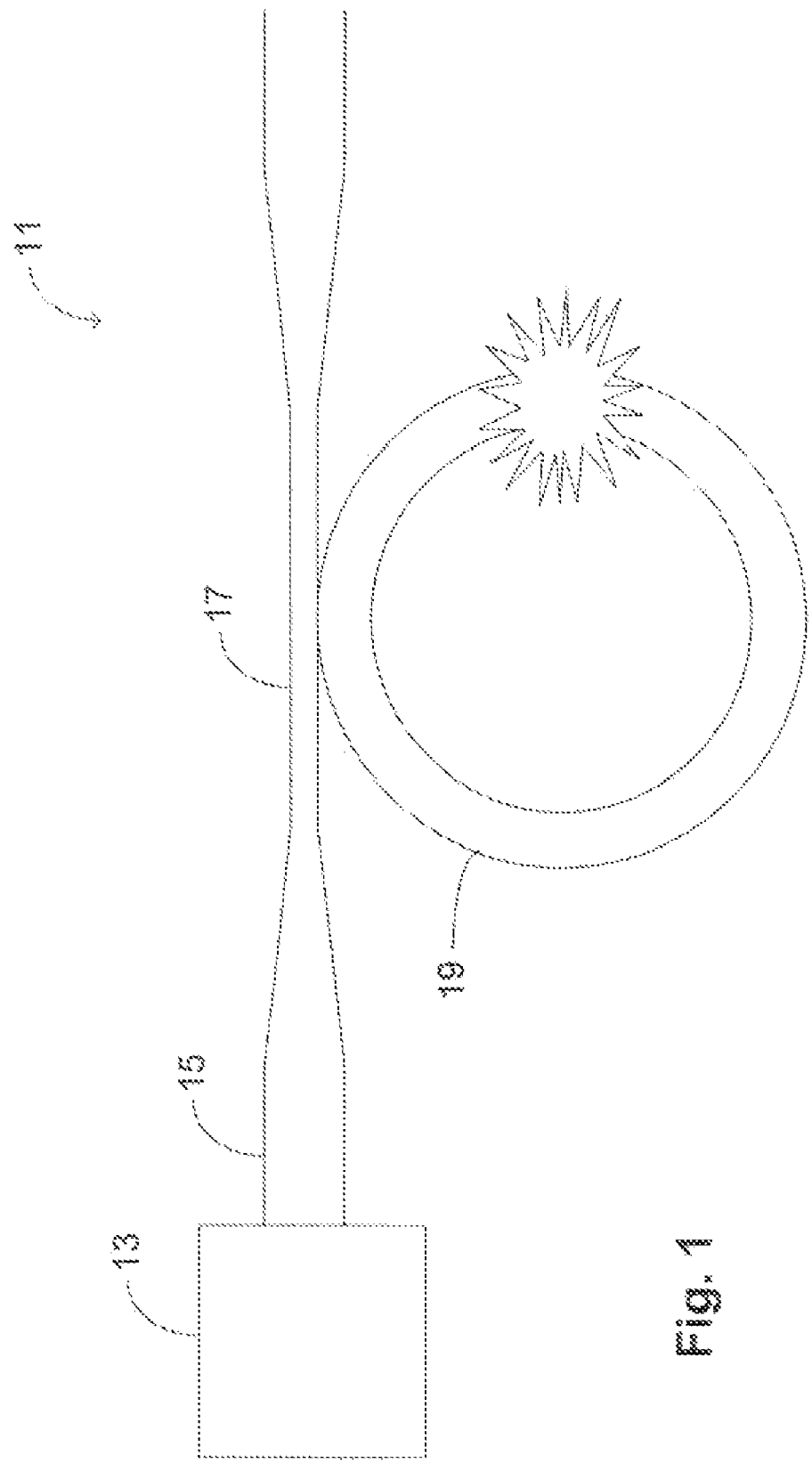

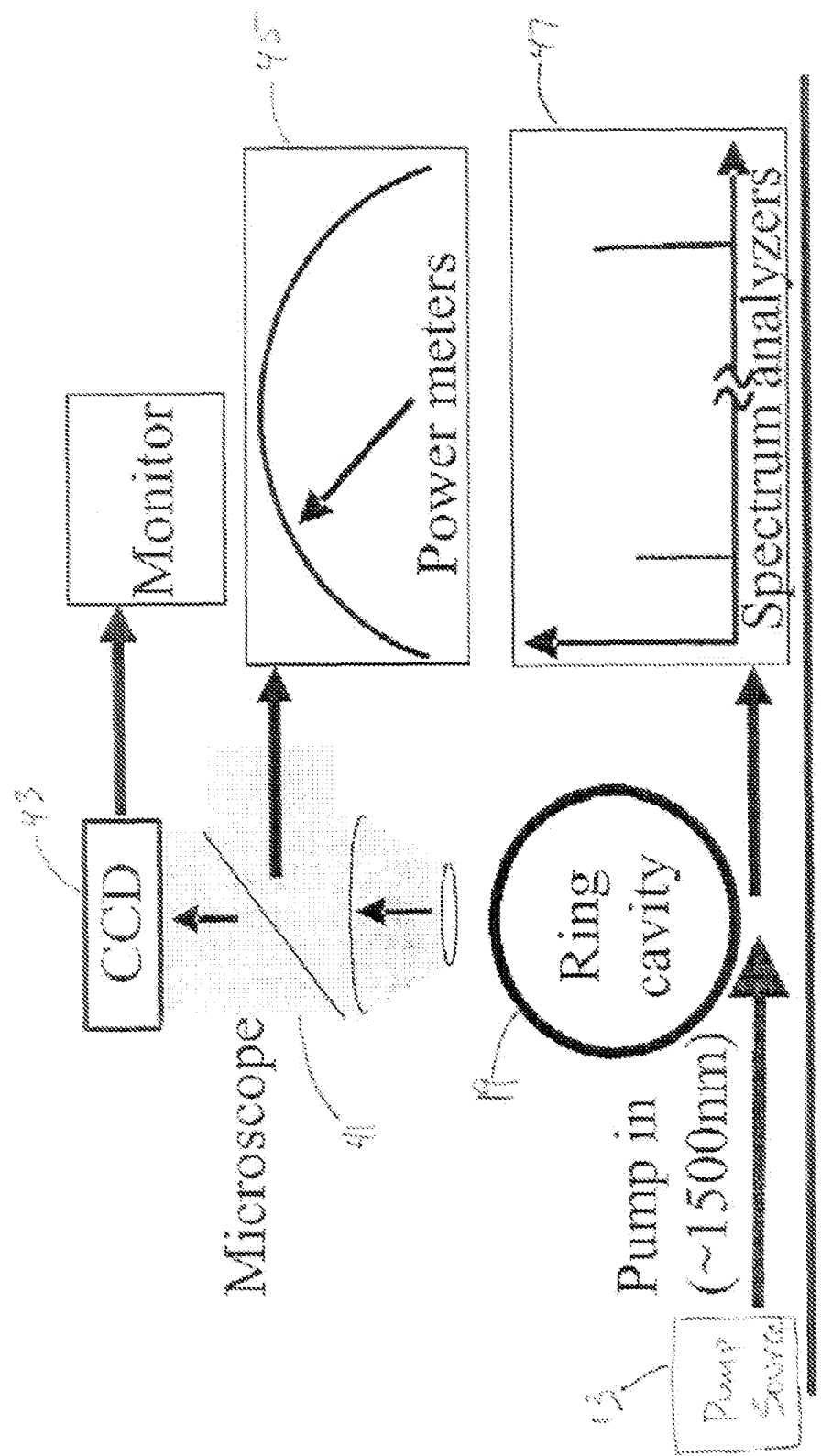

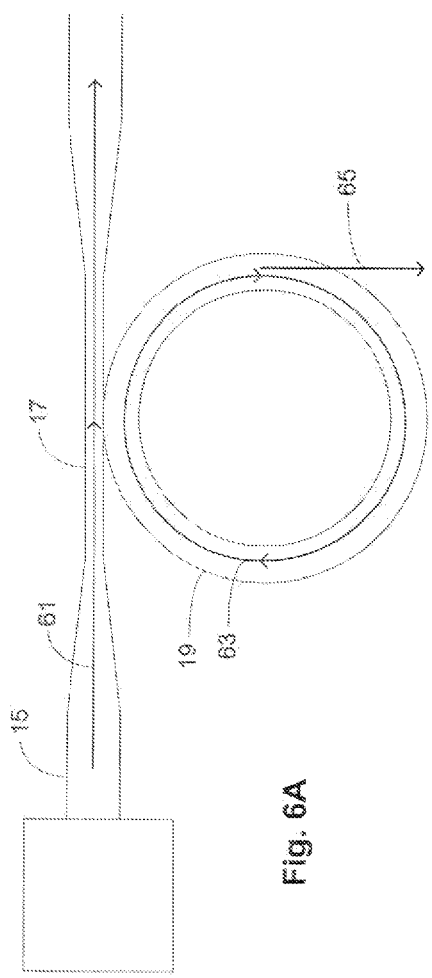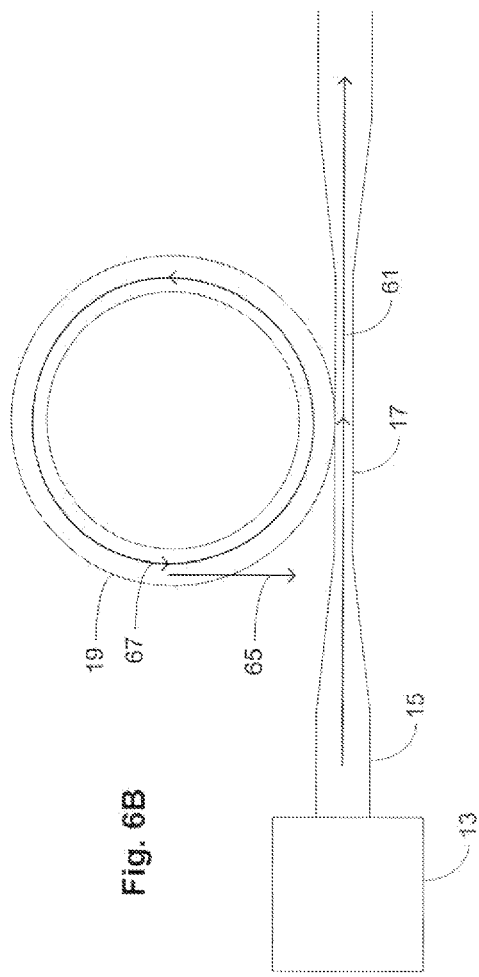

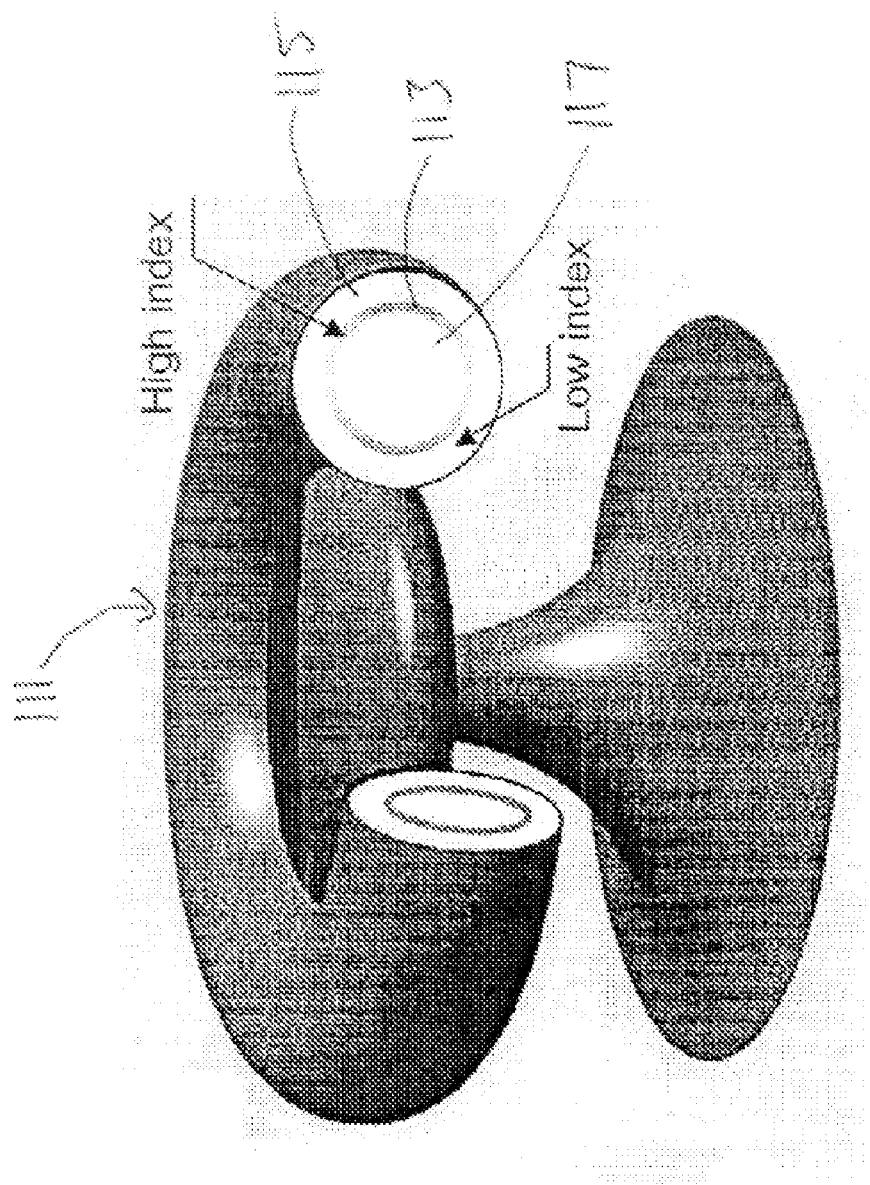

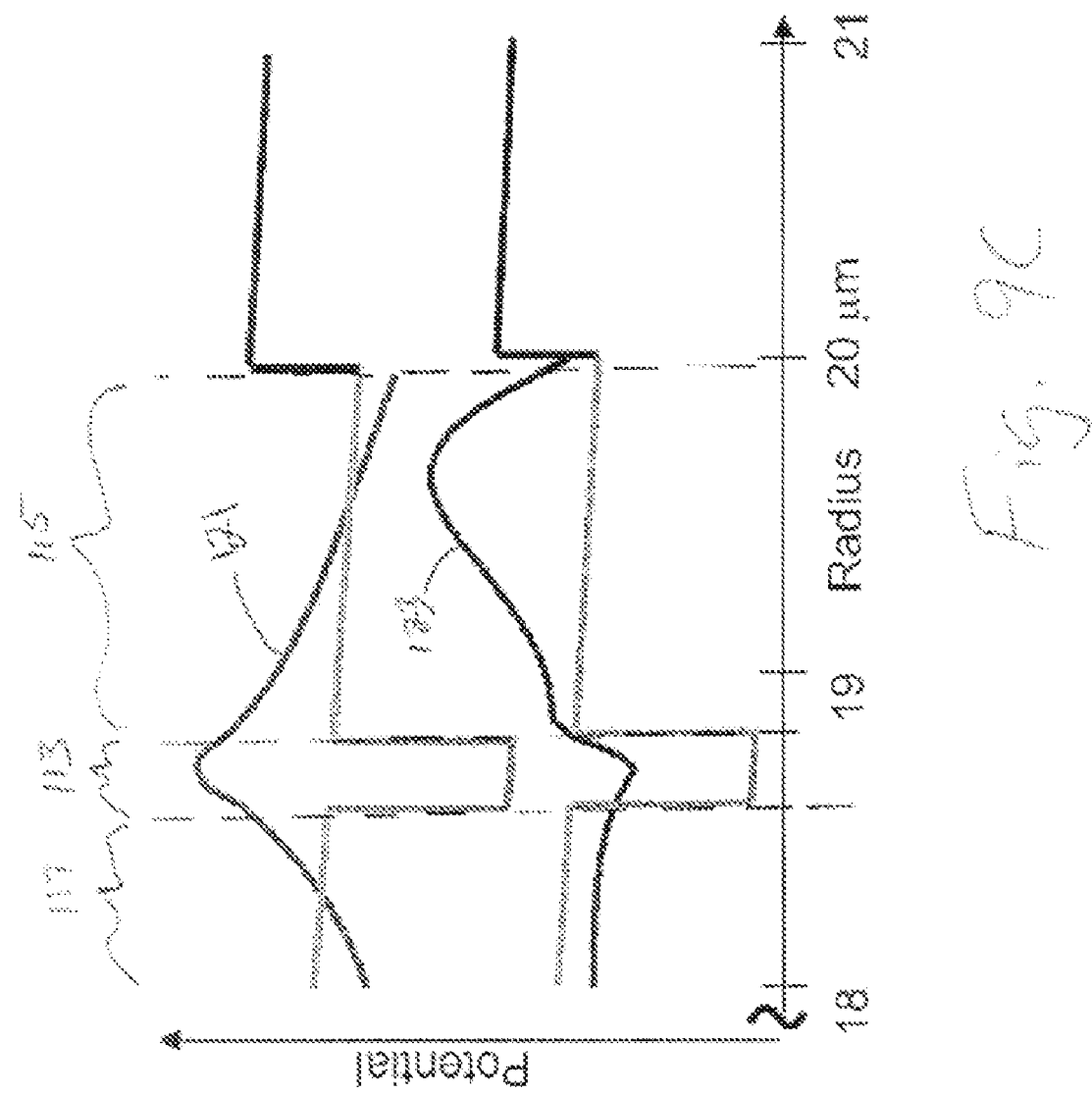

PHOTONIC DEVICE HAVING HIGHER ORDER HARMONIC EMISSIONS

PRIORITY

Priority is claimed to U.S. Provisional Patent Application No. 60/736,956, filed Nov. 15, 2005, the disclosure of which is incorporated herein by reference in its entirety.

STATEMENT REGARDING FEDERALLY SPONSORED RESEARCH

The U.S. Government has certain rights in the inventions disclosed herein pursuant to Grant No. HR0011-04-1-0032 awarded by the Defense Advanced Research Projects Agency (DARPA).

BACKGROUND OF THE INVENTION

1. Field of the Invention

The field of the present invention is photonic devices capable of generating higher order harmonic emissions, particularly those photonic devices that do not mask the higher order harmonic emissions by other emission modalities.

2. Background

Various micro-cavity resonators have been utilized to re-circulate light and store optical power. In a typical micro-cavity resonator, light traverses around an interior surface of the cavity. The optical power stored in the resonator can be used in cavity quantum electrodynamics (cQED), photonics, and various optics applications. For example, U.S. Pat. No. 6,633,696 describes use of a micro-cavity resonator as an optical signal modulator.

The surface quality or finish usually affects the Q factor of the resonator, which is a measurement of the relationship between stored energy and the rate of dissipation of the energy. Resonators having both high Q factors and ultra-high Q factors are known in the art. For purposes of establishing a point of reference, a "high" Q factor is generally defined as a Q factor between about $10^4$ up to about $10^6$, and an "ultra-high" Q factor is generally defined as a Q factor greater than $10^6$.

Surface-tension induced micro-cavities (STIM), such as droplets or micro-spheres, are examples of known high Q and ultra-high Q micro-cavities. Some STIMs, such as suspended liquid droplets, are known to have Q factors that approach $10^9$. Such ultra-high Q STIMs, however, are typically confined to the laboratory as a result of the fabrication controls that are required to produce and maintain the spherical shape. For example, in the paper by Acker et al., "Third-order optical sum-frequency generation in micrometer-sized liquid droplets", Optics Letters, Vol. 14, No. 8, p. 402 (Apr. 15, 1989), the disclosure of which is incorporated herein by reference, a liquid droplet of $CCl_4$ was demonstrated to exhibit third order harmonic emissions when a pulsed laser beam having power output of about 0.5 GW is incident upon the droplet. The laser is required to have such a high power output due to poor optical coupling between the laser beam and the droplet. While the discovery of third harmonic emissions from a liquid droplet is of scientific interest, application of this discovery has been limited to liquid droplets. This is primarily because liquid droplets provide the advantage of forming a perfect, or nearly perfect, sphere due to the surface tension of the liquid, and the spherical shape creates inversion symmetry which suppresses second harmonic emissions, thereby enhancing the third harmonic emissions. Practical micro-cavity resonators which are capable of efficiently generating third harmonic emissions, however, remain elusive.

More recently, U.S. Patent Publication No. 20040179573, the disclosure of which is incorporated herein by reference in its entirety, discloses a micro-cavity resonator which is capable of both high Q and ultra-high Q factors. The technical advantage of this micro-cavity resonator is based on the fact that it can be fabricated with traditional wafer-based processing techniques and equipment, thus making it cost-efficient for use in various photonics applications in which high Q and ultra-high Q resonant cavities are desirable. However, because such micro-cavity resonators are a relative new discovery, the full usefulness and capabilities of these resonators have yet to be determined.

SUMMARY OF THE INVENTION

The present invention is directed toward a photonic device having higher order harmonic emissions and a method of generating higher order harmonic emissions from a photonic device. Such higher order harmonic emissions, primarily of the third order or higher, are not obscured by lower order harmonic emissions because construction of the photonic device is such that the lower order harmonic emissions, which are typically stronger in many known photonic devices, are suppressed.

In a first separate aspect of the present invention, the micro-cavity resonator is adapted to exhibit inversion symmetry and is optically coupled to a pump source to receive light from a laser beam. The pump source is adapted to have a power output of less than approximately 1000 Watts, and preferably less than approximately 100 Watts. In response to light from the pump source, the micro-cavity resonator emits light at an emission frequency which is approximately three or more times the frequency of light from the pump source.

In a second separate aspect of the present invention, the micro-cavity resonator is adapted to suppress second order harmonic emissions and is optically coupled to a pump source to receive light from a laser beam. The pump source is adapted to have a power output of less than 1000 Watts, and preferably less than 100 Watts. In response to light from the pump source, the micro-cavity resonator emits light at an emission frequency which is approximately three or more times the frequency of light from the pump source.

In a third separate aspect of the present invention, the micro-cavity resonator is optically coupled to multiple pump sources and receives light from each of the pump sources. Each pump source emits a laser beam, and each laser beam has a different frequency. In response to light received from each of the pump sources, the micro-cavity resonator emits multiple frequencies of light. For example, if two pump sources are used, a first frequency of emitted light is approximately three or more times the frequency of light from one of the pump sources, while the second frequency of emitted light is approximately three or more times the frequency of light from the second pump source.

In a fourth separate aspect of the present invention, the micro-cavity resonator is optically coupled to multiple pump sources and receives light from each of the pump sources. Each pump source emits a laser beam, and each laser beam has a different frequency. In response to light received from each of the pump sources, the micro-cavity resonator emits light at an emission frequency. For example, if two pump sources are used, the emission frequency is a third order summation of a combination of light frequencies from both the first and second pump sources.

In a fifth separate aspect of the present invention, the method includes optically coupling the micro-cavity resonator to one or more pump sources. The micro-cavity resonator is adapted to exhibit inversion symmetry, such that when light is directed into the micro-cavity resonator from the pump source or pump sources, the micro-cavity resonator generates light at an emission frequency which is approximately three or more times the frequency of light from each of the pump sources.

In a sixth separate aspect of the invention, the micro-cavity resonator is constructed primarily from a first material and has one or more layers of one or more materials embedded within. The embedded materials are selected to aid phase matching within the micro-cavity resonator for both light from a pump source and light generated through third or higher order harmonic emissions within the micro-cavity resonator.

In a seventh separate aspect of the present invention, any of the foregoing aspects may be employed in combination.

Accordingly, an improved photonic device having higher order harmonic emissions and method of generating higher order harmonic emissions from a photonic device are disclosed. Advantages of the improvements will appear from the drawings and the description of the preferred embodiment.

BRIEF DESCRIPTION OF THE DRAWINGS

In the drawings, wherein like reference numerals refer to similar components:

FIG. 1 schematically illustrates a photonic device which is capable of generating a third harmonic emission;

FIG. 3 schematically illustrates a laboratory arrangement for analyzing emissions from the photonic device of FIG. 1;

FIGS. 6A & 6B schematically illustrate and compare relative directions of pump power, power circulating within the micro-cavity resonator, and third harmonic emissions when the direction of the pump power is altered;

FIG. 9A is a perspective, partial sectional view of an alternative micro-toroid resonator;

FIG. 9C is a plot illustrating calculated radial field distributions for the pump source and third harmonic modes within the micro-toroid resonator of FIG. 9A.

DETAILED DESCRIPTION OF THE PREFERRED EMBODIMENTS

Figure 2A:
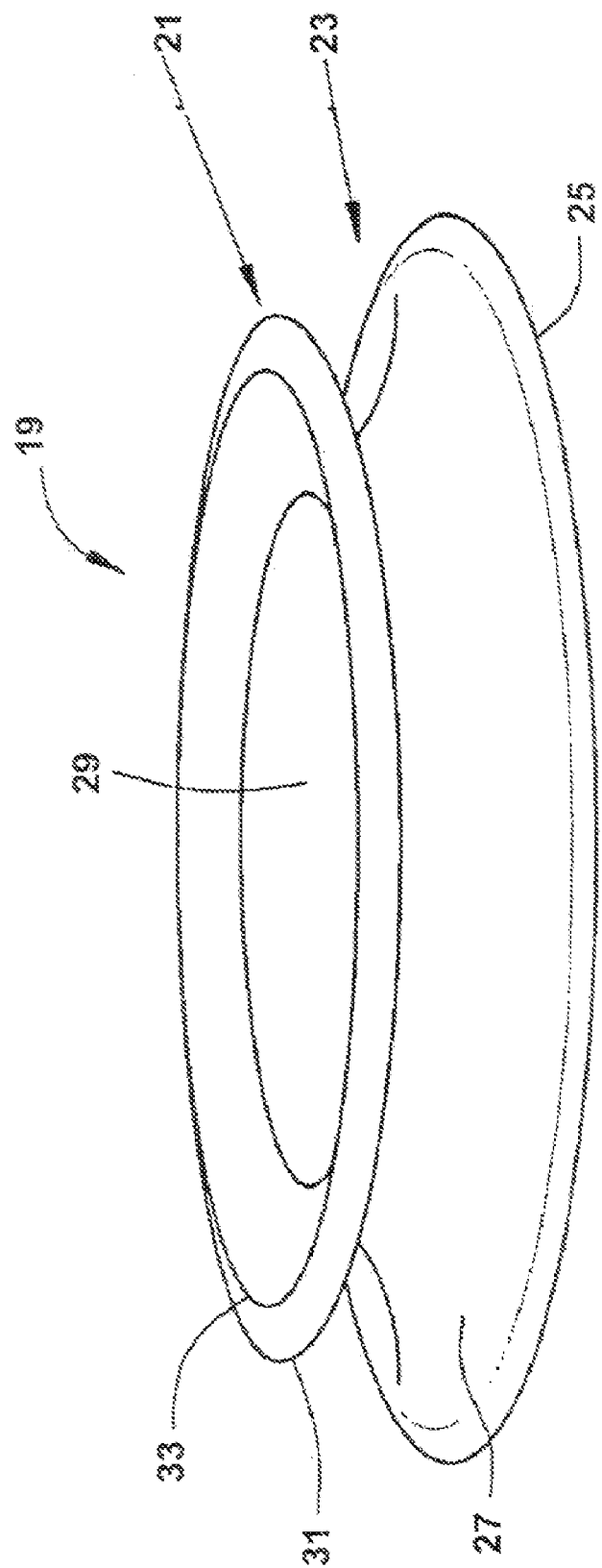
FIG. 2A is a perspective view of a micro-cavity resonator.

Turning in detail to the drawings, FIG. 1 illustrates a photonics device 11 which is capable of generating light emissions from third order or higher harmonics. A pump source 13 is optically coupled to a fiber waveguide 15 such that the laser beam emitted by the pump source 13 is directed into the fiber waveguide 15. The fiber waveguide 15 is constructed to have a waist region 17 which allows the fiber waveguide 15 to be optically coupled to the micro-cavity resonator 19 with relatively high efficiency. Once light enters the micro-cavity resonator 19, it circulates until it is emitted as part of a higher order harmonic emission process, which is described in further detail below. These higher order harmonic emissions have thus far been observed emerging from the micro-cavity resonator 19 at a location along the micro-cavity resonator 19 which is different from where the fiber waveguide 15 is coupled to the micro-cavity resonator 19.

The pump source 13 may have a broad range of power output while still enabling third order harmonic emissions from the micro-cavity resonator 19. This is at least partially due to the efficiency of the optical coupling provided by the fiber waveguide 15. Other factors include, but are not limited to, the small size of the micro-cavity resonator 19 and the efficiency, or Q factor, of the micro-cavity resonator 19. The power output of the pump source 13 may be as much as approximately 1000 W, or one, two, three, four, or more orders of magnitude less. For example, third harmonic emissions have been visually observed using a pump source 13 with a power output of 300 µW. It is expected that even lower power levels may be used to generate third harmonic emissions with such a photonic device, even though such emissions may be too dim for easy visual identification.

For purposes of the photonics device 11 described herein, light from the fiber waveguide 15 which is not coupled into the micro-cavity resonator 19 passes into the free end 21 of the fiber waveguide 15 and is not used. However, depending upon the intended application of the photonics device 11, light entering the free end 21 of the fiber waveguide 15 could be used for any conceivable purpose.

The preferred design and construction of the fiber waveguide 15 are detailed in U.S. Pat. No. 6,633,696, the disclosure of which is incorporated herein by reference in its entirety.

Figure 2B:
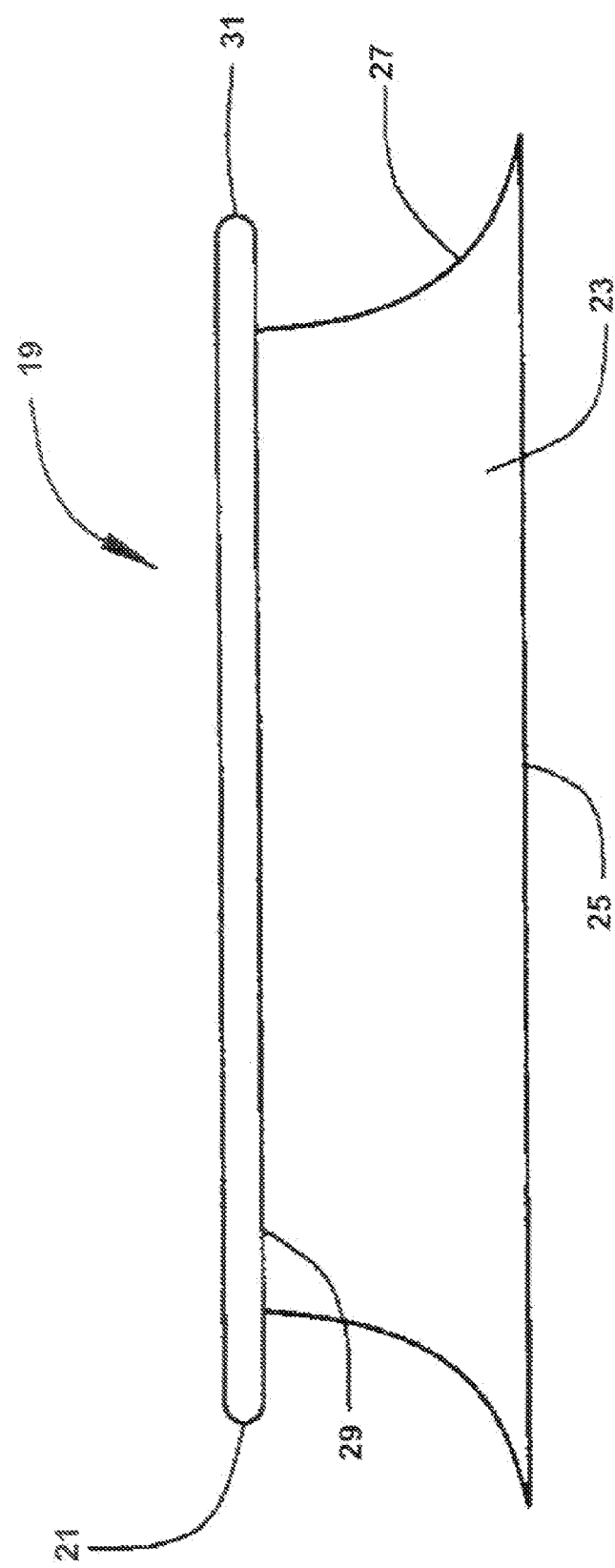
FIG. 2B is a side elevation view of micro-cavity resonator of FIG. 2A.

The micro-cavity resonator 19 is shown in detail in FIGS. 2A & 2B. This is the same monolithic ultra-high Q micro-cavity resonator disclosed in U.S. Patent Publication No. 20050163185, the disclosure of which is incorporated herein by reference in its entirety. The micro-cavity resonator 19 includes an optical material or micro-cavity 21 and a substrate 23. The micro-cavity 21 is shown in the form of a toroid, and is preferably constructed from silica. Both the shape and the silica aid in suppressing generation of emissions through second order harmonics through inversion symmetry. Thus, the micro-cavity 21 is capable of generating emissions through generation of third or higher order harmonics. Other shapes and materials may also be appropriate for the micro-cavity, with one of the important factors being suppression of second order harmonic emissions through a combination of geometric form and selection of materials. The substrate 23 includes a bottom surface 25, a middle tapered or angled surface 27, and a top surface 29. Portions of the substrate 23 that are located below the micro-cavity 21, e.g., below a periphery 31 of the micro-cavity 21, are removed so that the substrate 23 has the form of a support pillar. The inner edge 33 of the micro-cavity 21 extends around the outer edge of the top surface 29 of the substrate. Thus, the substrate 23 effectively supports and elevates or suspends the micro-cavity 21 above the bottom surface 25 of the substrate.

A system for generating and monitoring third harmonic emissions from a photonic device is illustrated in FIG. 3. The pump source 13 is optically coupled to the micro-cavity resonator 19 as previously discussed. A microscope 41 with an optical sensor 43 is arranged to receive and monitor emissions from the micro-cavity resonator 19. For efficient optical coupling, the microscope 41 is optically coupled to the micro-cavity resonator 19 at a location along the micro-cavity resonator 19 which is different from the location where the pump source 13 is coupled to the micro-cavity resonator 19. It should be evident that the microscope 41 could be optically coupled to the entire micro-cavity resonator 19 simply by having a wide field of view. Such a wide field of view, however, provides inefficient coupling with the micro-cavity resonator 12 and tends to introduce undesirable optical noise into the system. Such wide field coupling is therefore not practical for applications which require low noise levels.

Figure 4:
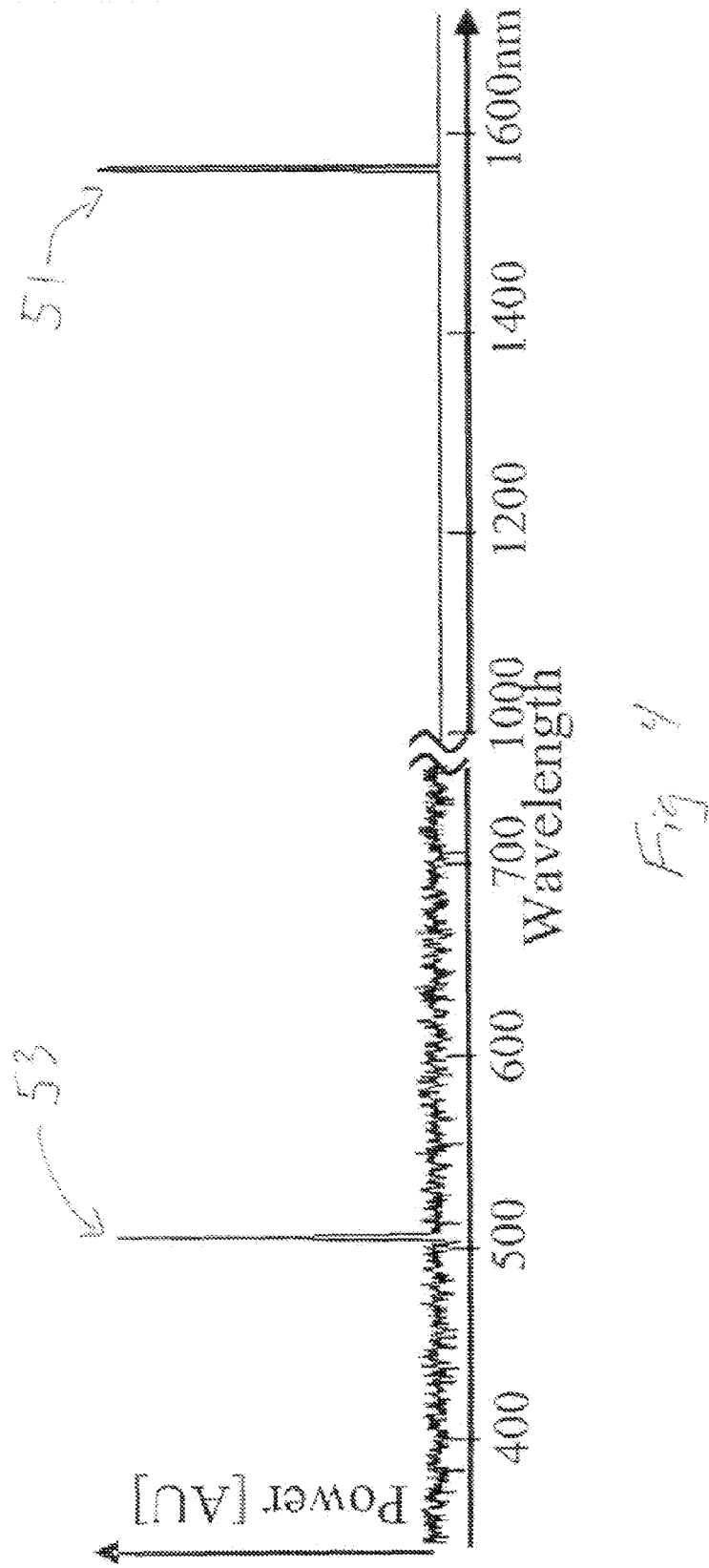
FIG. 4 is a graph illustrating respective input and emitted wavelengths from the photonic device of FIG. 1.

For the system shown in FIG. 3, the spectrum and power levels of both the pump source 13 and the harmonic emissions are monitored. A power meter 45 and spectrum analyzer 47 are provided for these purposes. A comparison of the wavelength of light from the pump source versus the wavelength of light from the harmonic emissions emerging from the micro-cavity resonator are shown in FIG. 4. For this comparison, the pump source generated a laser beam having a wavelength 51 of 1553.9 nm, and the micro-cavity resonator emitted light at a measured wavelength 53 of approximately 517.4 nm. This has been confirmed as a third harmonic emission of the micro-cavity resonator. Other configurations and materials for micro-cavity resonators may provide third or higher order harmonic emissions. The expected wavelength resulting from the micro-cavity resonator is 518.0 (1553.9/3), thus the measured wavelength deviates from the expected wavelength by only 0.1%, an amount which is comparable to the 0.4 nm resolution limit of the spectrum analyzer that was used. No other emission lines were observed within the range of the spectrum analyzers (190 nm to 1700 nm), thus demonstrating that third harmonic emissions are possible without competition from other processes within the micro-cavity resonator.

Figure 5:
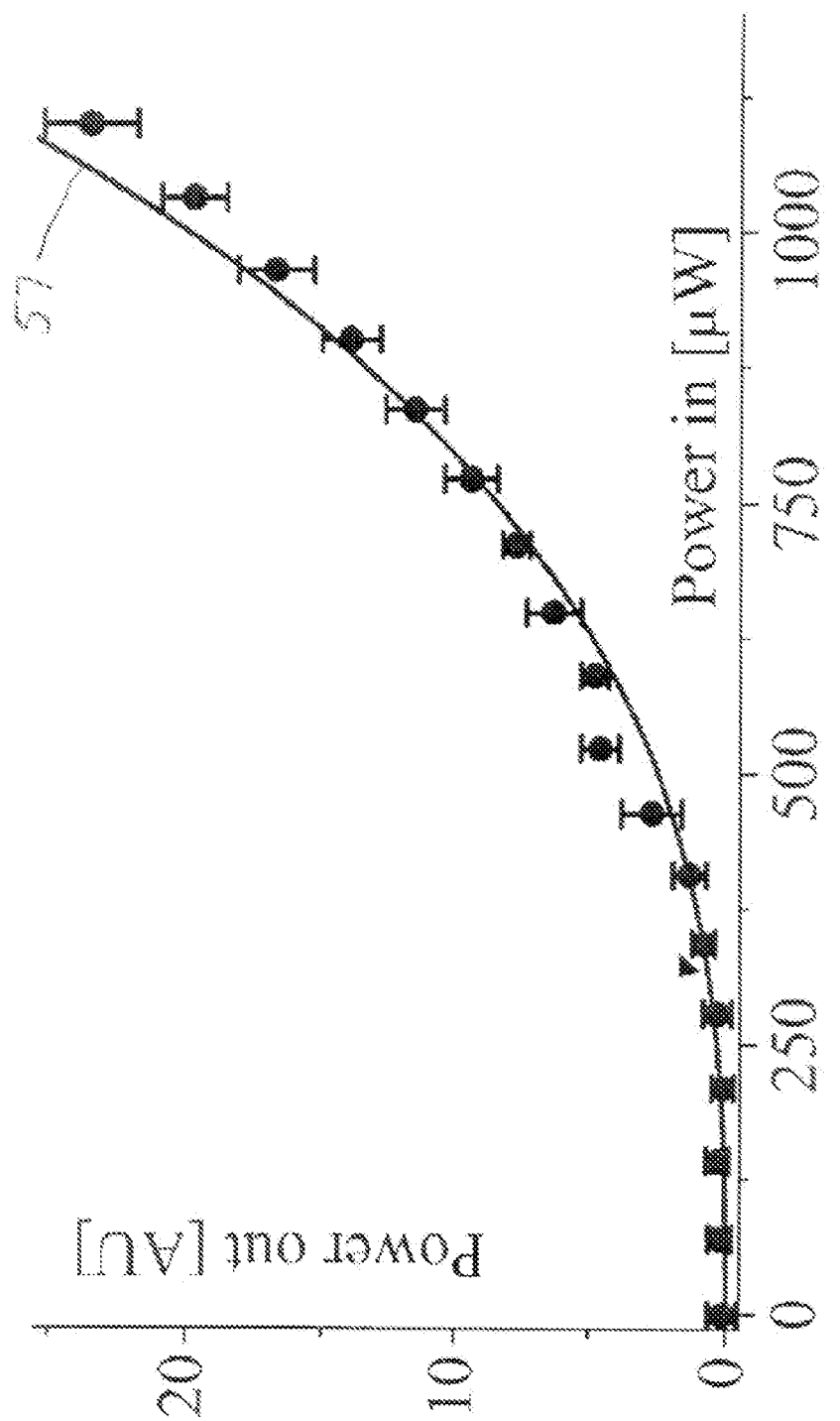
FIG. 5 is a graph plotting the pump power input into the photonic device of FIG. 1 vs. power from third harmonic emissions.

Measurement of power from third harmonic emissions as a function of pump source power is shown in FIG. 5. A logarithmic fit has been performed on the data, resulting in a curve showing that third harmonic emissions have an $x^{2954}$ dependency on pump power. This is a deviation of about 1.5% from the expected $x^3$ behavior. From this cubic power dependency (and also from the measured spectra in FIG. 4), it is believed that other effects, if they co-exist, are at least two orders of magnitude lower than the third harmonic emissions. It has been experimentally shown that even at a pump source power of 300 µW, the third harmonic emissions are visually observable. It is expected that even lower levels of pump source power may be used to generate third or higher order harmonic emissions as the Q factor of the micro-cavity resonator is improved.

An example serves to show the resonant enhancement achieved using micro-cavity resonator having a Q factor on the order of $10^6$, such as the micro-toroid shown in FIGS. 2A & 2B. A pump source emitting a laser at approximately 1550 nm and having a power output of 1 mW optically coupled to a micro-toroid gives rise to approximately 300 W of power circulating within the micro-toroid. This circulating power is concentrated within a typical modal cross-sectional area of only 2 $\mu m^2$, thereby creating a power intensity of approximately $10^{14}$ W/$m^2$ within the micro-toroid.

Other processes which may occur within the micro-cavity resonator include Raman and parametric oscillations, which are generally exhibited above a clear threshold pump power. Thus, third order and higher harmonic emissions may be produced without interference from other processes if the pump source power output is appropriately selected to be below the threshold for these processes. Other techniques may also be employed to raise the threshold power for these processes.

For example, the suppression of parametric effects is well understood and involves adjustment of the toroidal aspect ratio as described in T. J. Kippenberg et al., "Kerr-nonlinearity optical parametric oscillation in an ultrahigh-Q toroid microcavity", Physical Review Letters 93, No. 8, p. 83904 (2004). By way of another example, the threshold for Raman oscillations may be increased because Raman oscillations occur in a distinct band of wavelengths in relation to the wavelength of the pump power, thus making it possible to increase the threshold by introducing resonant absorption or resonant scattering in selected bands. This can be accomplished by use of rare-earth metals or the introduction of holographic index gratings into the micro-cavity resonator, both of which have been successfully incorporated in either toroids or silica microspheres. The incorporation of erbium into silicon is discussed in L. Yang et al., "Fiber-coupled erbium microlasers on a chip", Applied Physics Letters 83, 825 (2003), the disclosure of which is incorporated herein by reference. Incorporating erbium into the micro-cavity resonator would lower the Q factor of the resonator, hence raising the threshold for Raman over a band extending from 1420 nm to nearly 1600 nm. This would, in turn, free up operation of the micro-cavity resonator for input from the pump source in the approximate range of 1350 nm to 1420 nm for generation of third or higher order harmonic emissions, which would be in the range of approximately 450 nm to 473 nm. Alternatively, gratings could be incorporated into the micro-cavity resonator, in the manner discussed in V. S. Ilchenko et al. in Conference on Lasers and ElectroOptics, Vol. Tehnical Digest, Ed. aa. 67 (Optical Society of America, Baltimore; 1999), the disclosure of which is incorporated herein by reference. Such gratings would afford the opportunity to tune scattering into any desired band, thereby selectively reducing the Q factor for selected wavelengths.

FIGS. 6A & 6B show the relative directions of light within and emitted from a micro-toroid resonator 19 when light from the pump source 13 is coupled in from opposite sides of the micro-toroid resonator, but from the same direction. In FIG. 6A, light travels along the waveguide 15 in a first direction 61 and is coupled into the micro-cavity resonator 19, where light circulates in a clockwise direction 63. Light from third harmonic emissions emerging from the micro-cavity resonator 19 travels in a third direction 65. As part of each transition, the linear momentum of light is conserved. In FIG. 6B, light travels along the waveguide 15 in the same first direction 61, but is coupled into the opposite side of the micro-cavity resonator 19. In this arrangement, light circulates in a counter-clockwise direction 67. Light from third harmonic emissions emerging from the micro-cavity resonator 19 travels in the third direction 65, again, but is emerging from the opposite side of the micro-cavity resonator 19 as compared to the emissions in FIG. 6A. As before, for each transition, the linear momentum of light is conserved.

Figure 7:
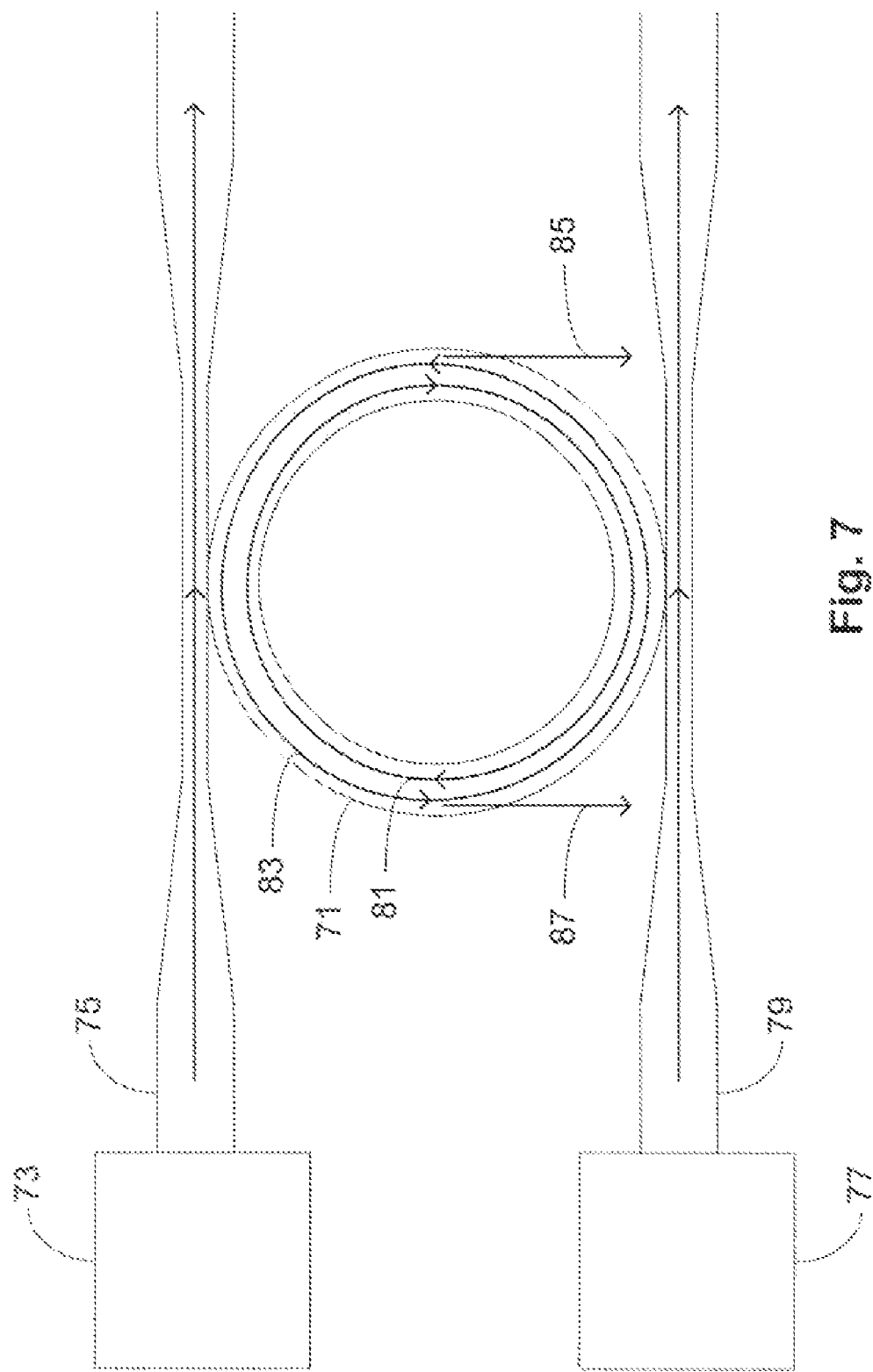
FIG. 7 schematically illustrates a second photonic device having two pump sources.

In FIG. 7, a micro-cavity resonator 71 is optically coupled to a first pump source 73 through a first waveguide 75 and to a second pump source 77 through a second waveguide 79. Light from each of the pump sources 73, 77 travels within the waveguides 75, 79 in the same relative direction, thus establishing two counter-rotating signals 81, 83 within the micro-cavity resonator 71. As a result, third order or higher harmonic emissions are generated by and emerge from the micro-cavity resonator 71 in the same, but counter-rotating, directions 85, 87. As discussed above, the linear momentum of light is conserved. For the arrangement shown in FIG. 7, the two pump sources 73, 77 may be configured to generate light at the same wavelength, or at different wavelengths. If the same wavelength is used, then both signals emitted by the micro-cavity resonator 71 will have the same effective wavelength. On the other hand, if the two pump sources 73, 77 are configured to generate light at different wavelengths, then the micro-cavity resonator 71 will generate two signals, each at a different wavelength.

Figure 8A:
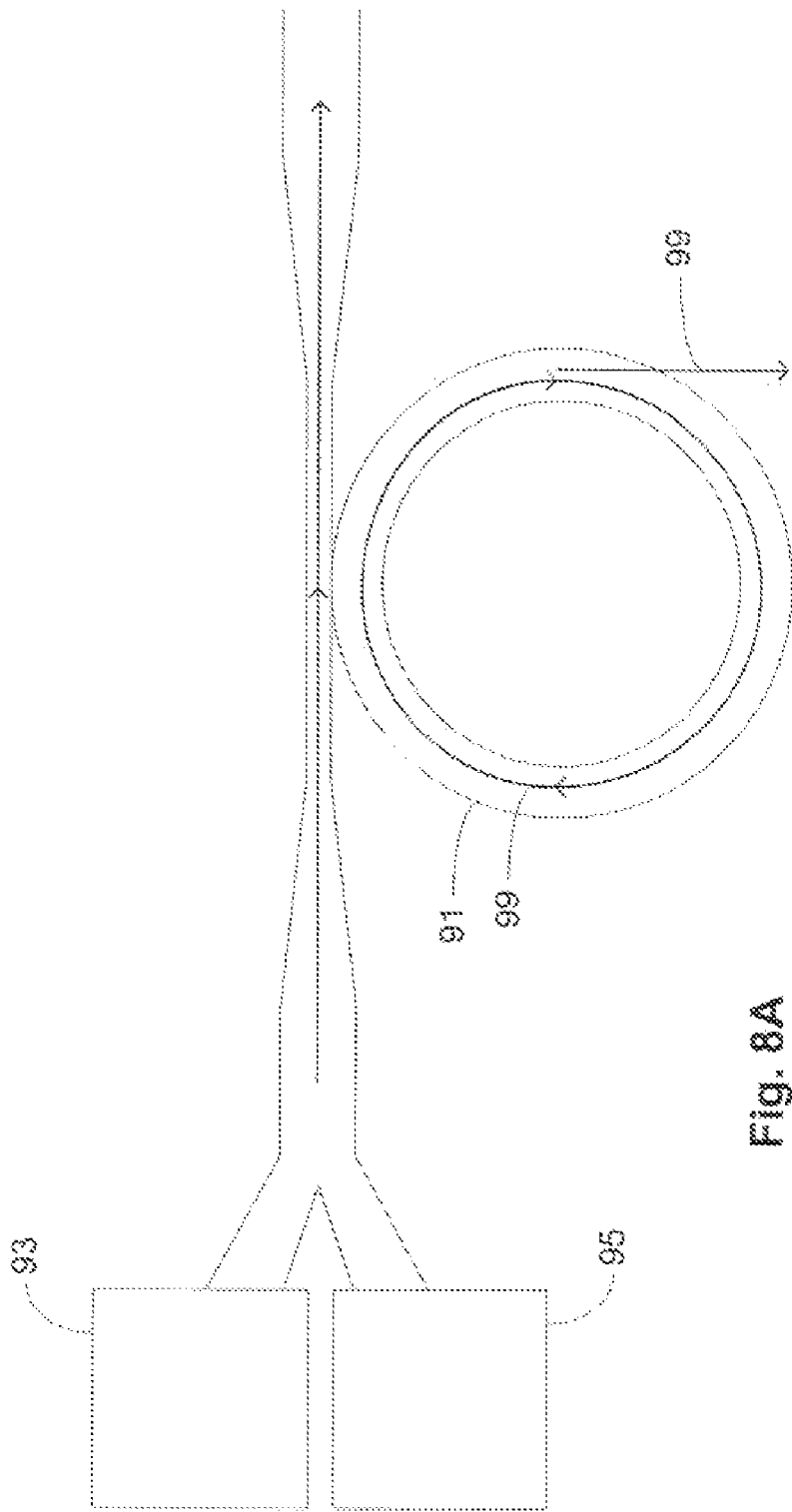
FIG. 8A schematically illustrates a third photonic device having two pump sources.
Figure 8B:
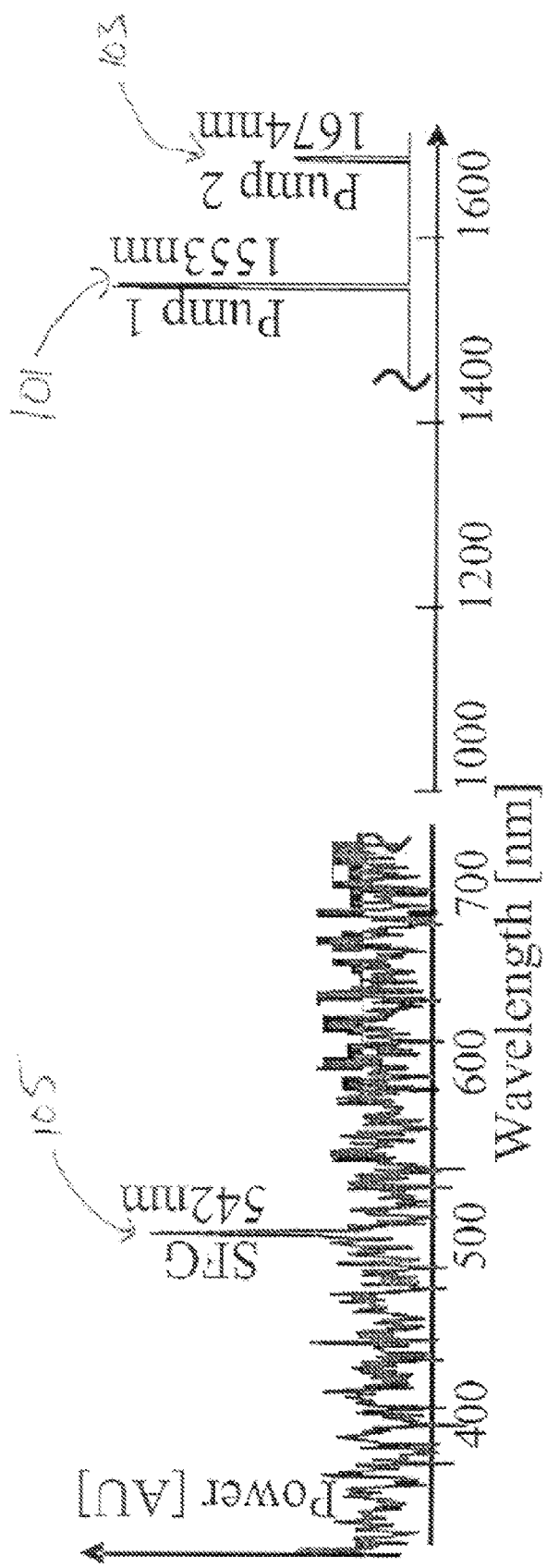
FIG. 8B is a graph illustrating respective input and emitted wavelengths from the photonic device of FIG. 8A.

FIG. 8A shows a micro-cavity resonator 91 optically coupled to two pump sources 93, 95 through a single waveguide 97. In this system, a single signal is generated by the micro-cavity resonator 91 because light from each of the pump sources 93, 95 rotates in the same direction 99 within the micro-cavity resonator 91. An advantage of this system is that the pump sources 93, 95 may be configured to emit light at different wavelengths so that third order or higher emissions from the micro-cavity resonator 91 are a combination of the wavelengths from the pump sources 93, 95. FIG. 8b shows experimental results, where the first pump source 93 was configured to emit light at a wavelength 101 of approximately 1553 nm, and the second pump source 95 was configured to emit light at a wavelength 103 of approximately 1674 nm, then emissions from the micro-cavity resonator 91 were measured at 542 nm, a combination of the two pump source signals by simple frequency summation (2/1674+1/1553=1/544). This is a third order summation of the frequencies from the two pump sources. Thus it is expected that emissions from a micro-cavity resonator can be generated over a wide spectra, limited chiefly by the transparency of the material from which the micro-cavity resonator is formed.

Figure 9B:
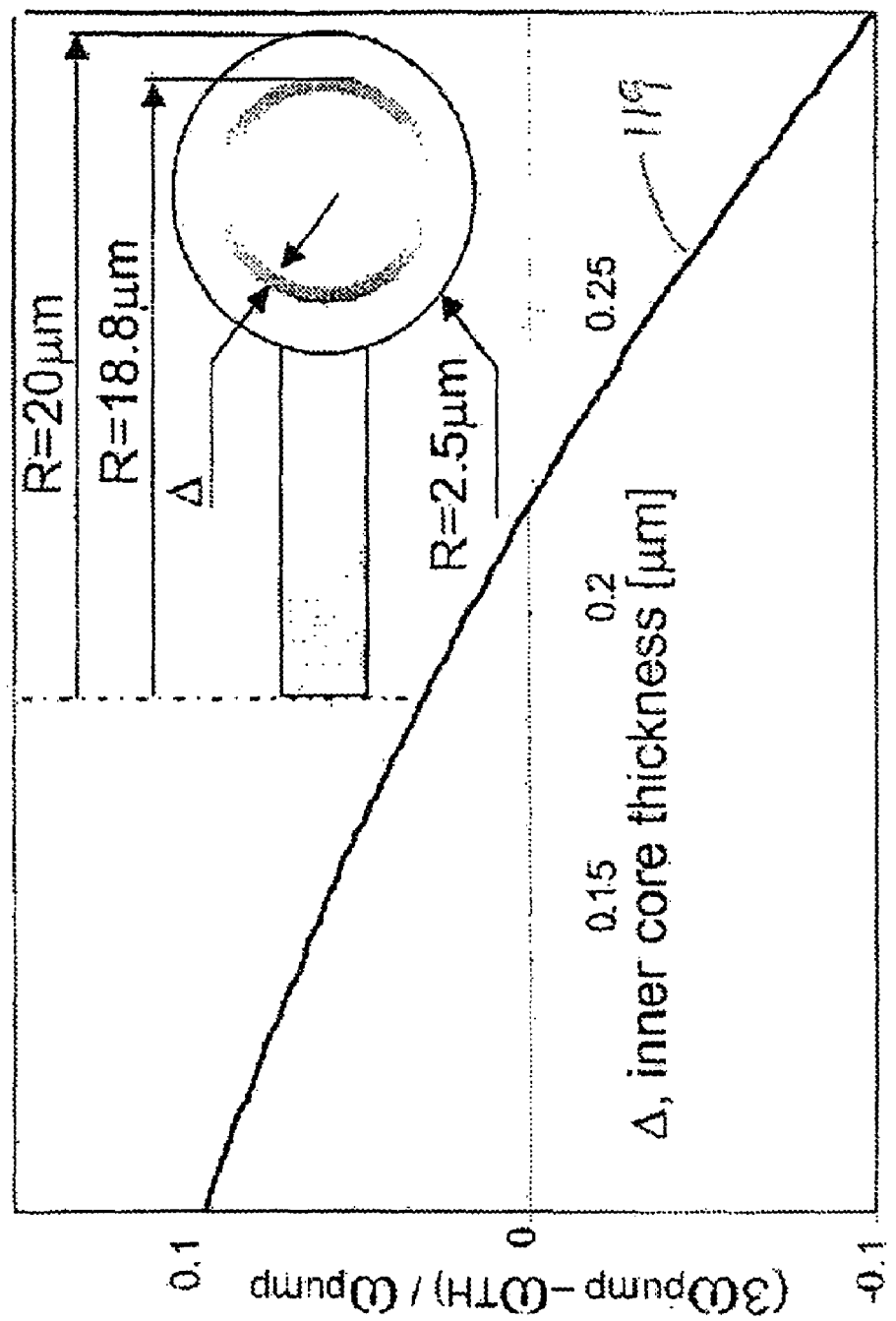
FIG. 9B is a graph illustrating the normalized frequency mismatch between fundamental pump source and third harmonic modes.

One additional consideration for construction of the micro-cavity resonator itself is phase matching the micro-cavity resonator with both the wavelength of light from the pump source and the wavelength of light generated through third order harmonic emissions. One way of performing phase matching is through adjustment of the overall dimensions of the micro-cavity resonator. This method, while potentially effective, has its disadvantages. A more ideal way of phase matching is to construct the micro-cavity resonator to excite a phase-matched mode of the third harmonic. FIG. 9A illustrates a micro-toroid resonator 111 which is constructed to address this phase matching issue. In this micro-toroid resonator 111, a sandwiched layer 113 of high-index $Si_3N_4$ is deposited through chemical vapor deposition, or other appropriate manufacturing techniques, between a toroidal silica core 115 and an outer layer of silica 117. In addition, other materials may be appropriate for depositing within the micro-toroid to improve phase matching. FIG. 9B illustrates a calculated plot 119 of $\Delta\omega/\omega_p$ as a function of the nitride layer width, where $\Delta\omega$ is the is the difference in frequency between the third order harmonic emission and the frequency of the pump source, $\omega_p$, for a mode pair where the wavelength of the pump source is three times that of the third harmonic emission. The intersection with abscissa gives the width of the $Si_3N_4$ which is best achieves phase match. FIG. 9C illustrates the calculated radial field distribution for each of light from the pump source 121 and light from third harmonic emissions 123 in the micro-toroid resonator 111 of FIG. 9A. As is evidenced from FIG. 9C, inclusion of the $Si_3N_4$ layer within the micro-toroid resonator 111 provides improved overlap between the third harmonic emissions and the pump source modes the micro-toroid resonator 111.

Thus, a photonic device having higher order harmonic emissions and a method of generating higher order harmonic emissions from a photonic device are disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A photonic device comprising:
   a pump source adapted to emit a laser beam at a source frequency, the pump source having a power output of less than approximately 100 Watts; and
   a micro-cavity resonator adapted to exhibit inversion symmetry and optically coupled to the pump source to receive light from the laser beam, wherein light is emitted from the micro-cavity resonator at an emission frequency while light is received from the laser beam, the emission frequency being approximately three or more times the source frequency.

2. The photonic device of claim 1, wherein the micro-cavity resonator is constructed of a material which exhibits inversion symmetry.

3. The photonic device of claim 1, wherein the pump source has a power output of less than 1 Watt.

4. The photonic device of claim 1, wherein the micro-cavity resonator has a Q value in excess of $10^5$.

5. The photonic device of claim 1 further including a waveguide optically coupling the pump source to the micro-cavity resonator.

6. The photonic device of claim 5, wherein the waveguide comprises a fiber waveguide.

7. The photonic device of claim 1, wherein micro-cavity resonator is monolithic.

8. The photonic device of claim 7, wherein micro-cavity resonator comprises a silica toroid supported by a silicon substrate.

9. A photonic device comprising:
   a pump source adapted to emit a laser beam at a source frequency, the pump source having a power output of less than approximately 100 Watts; and
   a micro-cavity resonator adapted to suppress second order harmonic emissions and optically coupled to the pump source to receive light from the laser beam, wherein light is emitted from the micro-cavity resonator at an emission frequency while light is received from the laser beam, the emission frequency being approximately three or more times the source frequency.

10. The photonic device of claim 9, wherein the micro-cavity resonator is constructed of a material which suppresses second order harmonic emissions.

11. The photonic device of claim 9, wherein the pump source has a power output of less than 1 Watt.

12. The photonic device of claim 9, wherein the micro-cavity resonator is constructed with a geometrical form which suppresses second order harmonic emissions.

13. The photonic device of claim 9, wherein the micro-cavity resonator has a Q value in excess of $10^5$.

14. The photonic device of claim 9 further including a waveguide optically coupling the pump source to the micro-cavity resonator.

15. The photonic device of claim 14, wherein the waveguide comprises a fiber waveguide.

16. The photonic device of claim 9, wherein micro-cavity resonator is monolithic.

17. The photonic device of claim 16, wherein micro-cavity resonator comprises a silica toroid supported by a silicon substrate.

18. A photonic device comprising:
a first pump source adapted to emit a first laser beam at a first source frequency, the first pump source having a first power output of less than approximately 100 Watts;
a second pump source adapted to emit a second laser beam at a second source frequency, the second pump source having a second power output of less than approximately 100 Watts; and
a micro-cavity resonator adapted to exhibit inversion symmetry and optically coupled to both the first pump source and the second pump source to receive light from the first laser beam and the second laser beam, respectively, wherein light is emitted from the micro-cavity resonator having at least one of a first emission frequency and a second emission frequency while light is received from at least one of the laser beams, the first emission frequency being approximately three or more times the first source frequency, and the second emission frequency being approximately three or more times the second source frequency.

19. The photonic device of claim 18, wherein the micro-cavity resonator is constructed of a material which exhibits inversion symmetry.

20. The photonic device of claim 18, wherein at least one of the first pump source and the second pump source has a power output of less than 1 Watt.

21. The photonic device of claim 18, wherein the micro-cavity resonator has a Q value in excess of $10^5$.

22. The photonic device of claim 18 further including a waveguide optically coupling the first pump source to the micro-cavity resonator.

23. The photonic device of claim 22, wherein the waveguide comprises a fiber waveguide.

24. The photonic device of claim 18, wherein micro-cavity resonator is monolithic.

25. The photonic device of claim 24, wherein micro-cavity resonator comprises a silica toroid supported by a silicon substrate.

26. The photonic device of claim 18, wherein the first source frequency is different from the second source frequency.

27. A photonic device comprising:
a first pump source adapted to emit a first laser beam at a first source frequency, the first pump source having a first power output of less than approximately 100 Watts;
a second pump source adapted to emit a second laser beam at a second source frequency, the second pump source having a second power output of less than approximately 100 Watts; and
a micro-cavity resonator adapted to exhibit inversion symmetry and optically coupled to both the first pump source and the second pump source to receive light from the first laser beam and the second laser beam, respectively, wherein light is emitted from the micro-cavity resonator at an emission frequency while light is received from the first and second pump sources, the emission frequency being approximately a third order summation of a combination of the first source frequency and the second source frequency.

28. The photonic device of claim 27, wherein the micro-cavity resonator is constructed of a material which exhibits inversion symmetry.

29. The photonic device of claim 27, wherein at least one of the first pump source and the second pump source has a power output of less than 1 Watt.

30. The photonic device of claim 27, wherein the micro-cavity resonator has a Q value in excess of $10^5$.

31. The photonic device of claim 27 further including a waveguide optically coupling the first pump source to the micro-cavity resonator.

32. The photonic device of claim 31, wherein the waveguide comprises a fiber waveguide.

33. The photonic device of claim 27, wherein micro-cavity resonator is monolithic.

34. The photonic device of claim 33, wherein micro-cavity resonator comprises a silica toroid supported by a silicon substrate.

35. The photonic device of claim 27, wherein the first source frequency is different from the second source frequency.

36. A photonic device comprising:
a micro-cavity resonator adapted to exhibit inversion symmetry;
a pump source optically coupled to the micro-cavity resonator on a first side of the micro-cavity resonator and adapted to emit a laser beam at a source frequency, such light from the laser beam is directed from the pump source into the micro-cavity resonator; and
a signal receiver optically coupled to the micro-cavity resonator on a second side of the micro-cavity resonator to receive light at an emission frequency emitted from the micro-cavity resonator, wherein the emission frequency is approximately three or more times the source frequency and the second side is different from the first side.

37. The photonic device of claim 36, wherein the micro-cavity resonator is constructed of a material which exhibits inversion symmetry.

38. The photonic device of claim 36, wherein the pump source has a power output of less than 1 Watt.

39. The photonic device of claim 36, wherein the micro-cavity resonator has a Q value in excess of $10^5$.

40. The photonic device of claim 36 further including a waveguide optically coupling the pump source to the micro-cavity resonator.

41. The photonic device of claim 40, wherein the waveguide comprises a fiber waveguide.

42. The photonic device of claim 36, wherein micro-cavity resonator is monolithic.

43. The photonic device of claim 42, wherein micro-cavity resonator comprises a silica toroid supported by a silicon substrate.

44. A method of generating higher order harmonic emissions from a photonic device, the method comprising:
optically coupling a micro-cavity resonator to a pump source, wherein the micro-cavity resonator is adapted to exhibit inversion symmetry, and the pump source is adapted to emit a laser beam at a source frequency and to have a power output of less than approximately 100 Watts; and
directing light from the laser beam into the micro-cavity resonator, thereby generating from the micro-cavity resonator light at an emission frequency which is approximately three or more times the source frequency.

45. The method of claim 44, wherein the micro-cavity resonator is constructed of a material which exhibits inversion symmetry.

46. The method of claim 44, wherein the pump source has a power output of less than 1 Watt.

47. The method of claim 44, wherein the micro-cavity resonator has a Q value in excess of $10^5$.

48. The method of claim 44, wherein optically coupling the micro-cavity resonator to the pump source include optically coupling the micro-cavity resonator to the pump source using a waveguide.

49. The method of claim 48, wherein the waveguide comprises a fiber waveguide.

50. The method of claim 44, wherein micro-cavity resonator is monolithic.

51. The method of claim 50, wherein micro-cavity resonator comprises a silica toroid supported by a silicon substrate.

52. A method of generating higher order harmonic emissions from a photonic device, the method comprising:
optically coupling a micro-cavity resonator to a pump source, wherein the micro-cavity resonator is adapted to suppress second order harmonic emissions, and the pump source is adapted to emit a laser beam at a source frequency and to have a power output of less than approximately 100 Watts; and
directing light from the laser beam into the micro-cavity resonator, thereby generating from the micro-cavity resonator light at an emission frequency which is approximately three or more times the source frequency.

53. The method of claim 52, wherein the micro-cavity resonator is constructed of a material which suppresses second order harmonic emissions.

54. The method of claim 52, wherein the micro-cavity resonator is constructed with a geometrical form which suppresses second order harmonic emissions.

55. The method of claim 52, wherein the pump source has a power output of less than 1 Watt.

56. The method of claim 52, wherein the micro-cavity resonator has a Q value in excess of $10^5$.

57. The method of claim 52, wherein optically coupling the micro-cavity resonator to the pump source includes optically coupling the micro-cavity resonator to the pump source using a waveguide.

58. The method of claim 57, wherein the waveguide comprises a fiber waveguide.

59. The method of claim 52, wherein micro-cavity resonator is monolithic.

60. The method of claim 59, wherein micro-cavity resonator comprises a silica toroid supported by a silicon substrate.

61. A method of generating higher order harmonic emissions from a photonic device, the method comprising:
optically coupling a micro-cavity resonator to a first pump source, wherein the micro-cavity resonator is adapted to exhibit inversion symmetry, and the first pump source is adapted to emit a first laser beam at a first source frequency and to have a first power output of less than approximately 100 Watts;
optically coupling the micro-cavity resonator to a second pump source, wherein the second pump source is adapted to emit a second laser beam at a second source frequency and to have a second power output of less than approximately 100 Watts;
directing light from the first laser beam into the micro-cavity resonator, thereby generating from the micro-cavity resonator light at a first emission frequency which is approximately three or more times the first source frequency; and
directing light from the second laser beam into the micro-cavity resonator, thereby generating from the micro-cavity resonator light at a second emission frequency which is approximately three or more times the second source frequency.

62. The method of claim 61, wherein the micro-cavity resonator is constructed of a material which exhibits inversion symmetry.

63. The method of claim 61, wherein at least one of the first pump source and the second pump source has a power output of less than 1 Watt.

64. The method of claim 61, wherein the micro-cavity resonator has a Q value in excess of $10^5$.

65. The method of claim 61, wherein optically coupling the micro-cavity resonator to the first pump source includes optically coupling the micro-cavity resonator to the first pump source using a waveguide.

66. The method of claim 65, wherein the waveguide comprises a fiber waveguide.

67. The method of claim 61, wherein micro-cavity resonator is monolithic.

68. The method of claim 67, wherein micro-cavity resonator comprises a silica toroid supported by a silicon substrate.

69. The method of claim 61, wherein the first source frequency is different from the second source frequency.

70. A method of generating higher order harmonic emissions from a photonic device, the method comprising:
optically coupling a micro-cavity resonator to a first pump source, wherein micro-cavity resonator is adapted to exhibit inversion symmetry, and the first pump source is adapted to emit a first laser beam at a first source frequency and to have a first power output of less than approximately 100 Watts;
optically coupling the micro-cavity resonator to a second pump source, wherein the second pump source is adapted to emit a second laser beam at a second source frequency and to have a second power output of less than approximately 100 Watts;
directing light from the first laser beam into the micro-cavity resonator; and
directing light from the second laser beam into the micro-cavity resonator, wherein the micro-cavity resonator generates light at an emission frequency which is approximately a third order summation of a combination of the first source frequency and the second source frequency.

71. The method of claim 70, wherein the micro-cavity resonator is constructed of a material which exhibits inversion symmetry.

72. The method of claim 70, wherein at least one of the first pump source and the second pump source has a power output of less than 1 Watt.

73. The method of claim 70, wherein the micro-cavity resonator has a Q value in excess of $10^5$.

74. The method of claim 70, wherein optically coupling the micro-cavity resonator to the first pump source includes optically coupling the micro-cavity resonator to the first pump source using a waveguide.

75. The method of claim 74, wherein the waveguide comprises a fiber waveguide.

76. The method of claim 70, wherein micro-cavity resonator is monolithic.

77. The method of claim 76, wherein micro-cavity resonator comprises a silica toroid supported by a silicon substrate.

78. The method of claim 70, wherein the first source frequency is different from the second source frequency.

79. A method of generating higher order harmonic emissions from a photonic device, the method comprising:
optically coupling a pump source to a first side of a micro-cavity resonator, wherein the micro-cavity resonator is adapted to exhibit inversion symmetry, and the pump source is adapted to emit a laser beam at a source frequency;

directing light from the laser beam into the micro-cavity resonator, thereby generating from the micro-cavity resonator light at an emission frequency which is approximately three or more times the source frequency; and receiving light emitted from the micro-cavity resonator with a signal receiver optically coupled to a second side of the micro-cavity resonator, wherein the second side is different from the first side.

80. The method of claim 79, wherein the micro-cavity resonator is constructed of a material which exhibits inversion symmetry.

81. The method of claim 79, wherein the pump source has a power output of less than 1 Watt.

82. The method of claim 79, wherein the micro-cavity resonator has a Q value in excess of $10^5$.

83. The method of claim 79, wherein optically coupling the micro-cavity resonator to the pump source include optically coupling the micro-cavity resonator to the pump source using a waveguide.

84. The method of claim 83, wherein the waveguide comprises a fiber waveguide.

85. The method of claim 79, wherein micro-cavity resonator is monolithic.

86. The method of claim 79, wherein micro-cavity resonator comprises a silica toroid supported by a silicon substrate.

* * * * *